United States Patent
Kramer et al.

(10) Patent No.: US 8,202,920 B2
(45) Date of Patent: *Jun. 19, 2012

(54) HEAT-CURABLE EPOXY RESIN COMPOSITION COMPRISING A BLOCKED POLYURETHANE PREPOLYMER

(75) Inventors: Andreas Kramer, Zurich (CH); Juergen Finter, Zurich (CH)

(73) Assignee: Sika Technology AG, Baar (CH)

( * ) Notice: Subject to any disclaimer, the term of this patent is extended or adjusted under 35 U.S.C. 154(b) by 208 days.

This patent is subject to a terminal disclaimer.

(21) Appl. No.: 12/311,661

(22) PCT Filed: Oct. 24, 2007

(86) PCT No.: PCT/EP2007/061418
§ 371 (c)(1),
(2), (4) Date: Apr. 8, 2009

(87) PCT Pub. No.: WO2008/049859
PCT Pub. Date: May 2, 2008

(65) Prior Publication Data
US 2010/0009196 A1    Jan. 14, 2010

(30) Foreign Application Priority Data
Oct. 24, 2006    (EP) .................................. 06122865

(51) Int. Cl.
*C08L 63/00* (2006.01)
*C08L 77/00* (2006.01)
*C09J 163/00* (2006.01)
*B32B 27/38* (2006.01)

(52) U.S. Cl. ........ 523/400; 156/330; 428/413; 524/538; 525/523

(58) Field of Classification Search .................. 523/400; 525/449
See application file for complete search history.

(56) References Cited

U.S. PATENT DOCUMENTS

| | | | |
|---|---|---|---|
| 4,701,512 A * | 10/1987 | Parker | 528/45 |
| 2004/0266899 A1* | 12/2004 | Muenz et al. | 521/135 |
| 2005/0159511 A1* | 7/2005 | Kramer | 523/427 |
| 2007/0066721 A1* | 3/2007 | Kramer et al. | 523/400 |
| 2009/0288766 A1* | 11/2009 | Kramer et al. | 156/275.5 |
| 2010/0273005 A1* | 10/2010 | Kramer et al. | 428/414 |

FOREIGN PATENT DOCUMENTS

| | | |
|---|---|---|
| EP | 0 338 985 B1 | 5/1994 |
| JP | A H05-163474 | 6/1993 |
| JP | A H06-299049 | 10/1994 |
| WO | WO 03/093387 A1 | 11/2003 |
| WO | WO 2004/055092 A1 | 7/2004 |
| WO | WO 2005/007720 A1 | 1/2005 |
| WO | WO 2005/007766 A1 | 1/2005 |
| WO | WO 2005007720 A1 * | 1/2005 |

OTHER PUBLICATIONS

Japanese Office Action issued in Japanese Application No. 2009-533829 mailed Oct. 18, 2011 with English-language translation.

* cited by examiner

*Primary Examiner* — Mark Eashoo
*Assistant Examiner* — David Karst
(74) *Attorney, Agent, or Firm* — Oliff & Berridge, PLC

(57) ABSTRACT

Discussed are heat-curable epoxy resin compositions containing at least one epoxy resin with, on average, more than one epoxide group per molecule, at least one curing agent for epoxy resins, which is activated by an increased temperature and at least one terminally blocked polyurethane prepolymer. Said epoxy resin compositions are particularly suitable for use as one-component, heat-curable adhesives and are characterized by excellent mechanical properties, high glass transition temperatures and high impact resistance.

30 Claims, No Drawings

HEAT-CURABLE EPOXY RESIN COMPOSITION COMPRISING A BLOCKED POLYURETHANE PREPOLYMER

TECHNICAL FIELD

The invention relates to the field of impact modifiers and to the field of heat-curing epoxy resin compositions.

PRIOR ART

Impact modifiers have a long history of use for improving the strength of adhesives subject to impact forces. Epoxy resin compositions in particular generally have high mechanical strengths but are very brittle, and this means that when the cured epoxy resin is subject to an impact force, for example one arising in a vehicle collision, it fractures, and the bond is therefore destroyed.

Liquid rubbers have a relatively long history of use as tougheners. Examples of liquid rubbers used are those based on acrylonitrile/butadiene copolymers, examples being obtainable as Hycar®.

EP-B-0 338 985 describes impact-resistant epoxy resin compositions which comprise not only liquid rubbers based on acrylonitrile/butadiene copolymers but also liquid rubbers based on polyurethane prepolymers, where these have capping by a phenol or by a lactam.

WO-A-2005/007766 discloses epoxy resin compositions which comprise a reaction product of a prepolymer capped by isocyanate groups and of a capping agent selected from the group of bisphenol, phenol, benzyl alcohol, aminophenol, or benzylamine. However, these epoxy resin compositions exhibit weaknesses in low-temperature impact resistance (<0° C.).

WO-A-03/093387 discloses impact-resistant epoxy resin compositions which comprise adducts of dicarboxylic acids with glycidyl ethers, or of bis(aminophenyl) sulfone isomers, or of aromatic alcohols, with glycidyl ethers. However, these compositions likewise have shortcomings in low-temperature impact resistance (<0° C.).

WO-A-2004/055092 and WO-A-2005/007720 disclose epoxy resin compositions with improved impact resistance, which comprise a reaction product of a polyurethane prepolymer terminated by isocyanate groups with a monohydroxyepoxide. These epoxy resin compositions have improved low-temperature impact resistance when compared with those comprising phenol-terminated polyurethane prepolymers, but are still not ideal.

U.S. Pat. No. 4,701,512 discloses benzoxazolinone and benzoxazinedione as capping agents for isocyanates, and their use as capped hardeners for epoxy resins, in optional combination with catalysts. However, these compositions do not comprise any additional hardeners for epoxy resins, and, at a temperature of from 180° C. to 200° C., are hardened almost entirely by way of said capped isocyanates, and compositions of this type do not have adequate mechanical properties for adhesives.

BRIEF DESCRIPTION OF THE INVENTION

It is therefore an object of the present invention to provide heat-curing epoxy resin compositions which have improved impact resistances, and also have high mechanical properties and in particular have a high glass transition temperature.

Surprisingly it has been found that this object can be satisfied by a composition as claimed in claim 1. A particularly surprising finding has been that it was sometimes possible to achieve a marked increase in particular in low-temperature impact resistance, in comparison with the prior art.

A further aspect of the invention provides the use of the end-capped polyurethane prepolymer of the formula (I), in particular of the formula (I'), as means of improving impact resistance, in particular of epoxy resin compositions.

Further aspects are the use of the heat-curing epoxy resin compositions as single-component heat-curing adhesive, a process for adhesive bonding as claimed in claim 30, and also the adhesive-bonded items resulting therefrom.

Particularly preferred embodiments are provided by the subclaims.

EMBODIMENTS OF THE INVENTION

The present invention firstly provides a heat-curing epoxy resin composition which comprises at least one epoxy resin A having an average of more than one epoxide group per molecule, at least one hardener B for epoxy resins, where this hardener is activated via an elevated temperature, and at least one end-capped polyurethane prepolymer of the formula (I) described above.

The heat-curing composition comprises at least one epoxy resin A having an average of more than one epoxide group per molecule. The epoxy group is preferably present as a glycidyl ether group. The epoxy resin A having an average of more than one epoxide group per molecule is preferably a liquid epoxy resin or a solid epoxy resin. The term "solid epoxy resin" is very well known to the person skilled in the art of epoxy resins, and is used in contrast to "liquid epoxy resins". The glass transition temperature of solid resins is above room temperature, i.e. they can be comminuted at room temperature to give flowable powders.

Preferred solid epoxy resins have the formula (X)

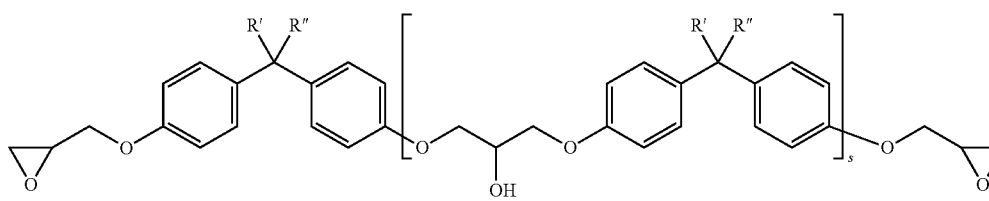

The substituents R' and R" here, independently of one another, are either H or $CH_3$. The index s is moreover a value >1.5, in particular from 2 to 12.

The term "independently of one another" or "independently of the others" in this document means, in the context of substituents, moieties, or groups, that identically designated substituents, moieties, or groups can occur simultaneously with a different meaning in the same molecule.

Solid epoxy resins of this type are commercially available, for example from Dow or Huntsman, or Hexion.

Compounds of the formula (X) having an index s from 1 to 1.5 are termed semisolid epoxy resins by the person skilled in the art. For this invention, they are likewise considered to be solid resins. However, preference is given to epoxy resins in the narrower sense, i.e. where the index s has a value >1.5.

Preferred liquid epoxy resins have the formula (XI)

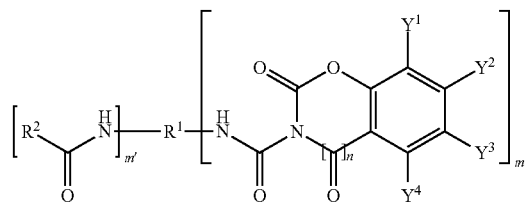

(I)

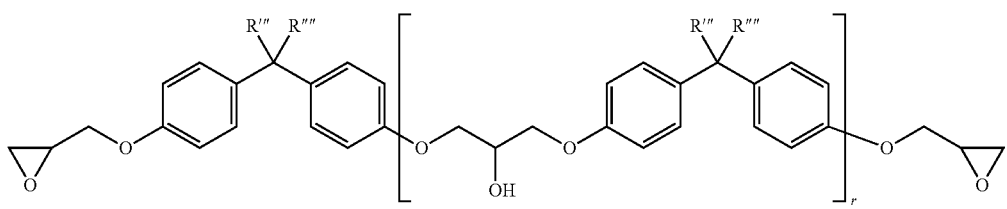

(XI)

The substituents R''' and R'''' here, independently of one another, are either H or CH$_3$. The index r moreover is a value from 0 to 1. r is preferably a value smaller than 0.2.

These materials are therefore preferably diglycidyl ethers of bisphenol A (DGEBA), of bisphenol F, or else of bisphenol A/F (where the term "A/F" here indicates a mixture of acetone with formaldehyde used as starting material in the production of this material). Liquid resins of this type are available by way of example in the form of Araldite® GY 250, Araldite® PY 304, Araldite® GY 282 (Huntsman) or D.E.R.™ 331 or D.E.R.™ 330 (Dow), or Epikote 828 (Hexion).

It is preferable that the epoxy resin A is a liquid epoxy resin of the formula (XI). In an embodiment to which even more preference is given, the heat-curing epoxy resin composition comprises at least one liquid epoxy resin of the formula (XI) but also at least one solid epoxy resin of the formula (X).

The proportion of epoxy resin A is preferably from 10 to 85% by weight, in particular from 15 to 70% by weight, with preference from 15 to 60% by weight, based on the weight of the composition.

The composition of the invention further comprises at least one hardener B for epoxy resins, where this hardener is activated via an elevated temperature. The materials here are preferably a hardener selected from the group consisting of dicyandiamide, guanamines, guanidines, aminoguanidines, and their derivatives. It is also possible to use accelerating hardeners, e.g. substituted ureas, such as 3-chloro-4-methylphenylurea (chlortoluron), or phenyldimethylureas, in particular p-chlorophenyl-N,N-dimethylurea (monuron), 3-phenyl-1,1-dimethylurea (fenuron) or 3,4-dichlorophenyl-N,N-dimethylurea (diuron). It is also possible to use compounds of the class of the imidazoles and amine complexes.

It is preferable that the hardener B involves a hardener selected from the group consisting of dicyandiamide, guanamines, guanidines, aminoguanidines, and their derivatives; substituted ureas, in particular 3-chloro-4-methylphenylurea (chlortoluron), or phenyldimethylureas, in particular p-chlorophenyl-N,N-dimethylurea (monuron), 3-phenyl-1,1-dimethylurea (fenuron) or 3,4-dichlorophenyl-N,N-dimethylurea (diuron), and also imidazoles and amine complexes.

Dicyandiamide is particularly preferred as hardener B.

The total proportion of the hardener B is advantageously from 0.5 to 12% by weight, preferably from 2 to 8% by weight, based on the weight of the entire composition.

The composition according to the invention further contains an end-capped polyurethane prepolymer of the formula (I)

$R^1$ here is a linear or branched polyurethane prepolymer PU1 terminated by m+m' isocyanate groups, after removal of all of the terminal isocyanate groups. Furthermore, $Y^1, Y^2, Y^3$ and $Y^4$, independently of the others, are H, halogen, NO$_2$, alkyl, or alkoxy and m is a value from 1 to 8, m' is a value from 0 to 7 and n is 0 or 1. The proviso that m+m' is a value from 2 to 8 applies.

Furthermore, $R^2$, independently of the others, is a substituent selected from the group consisting of

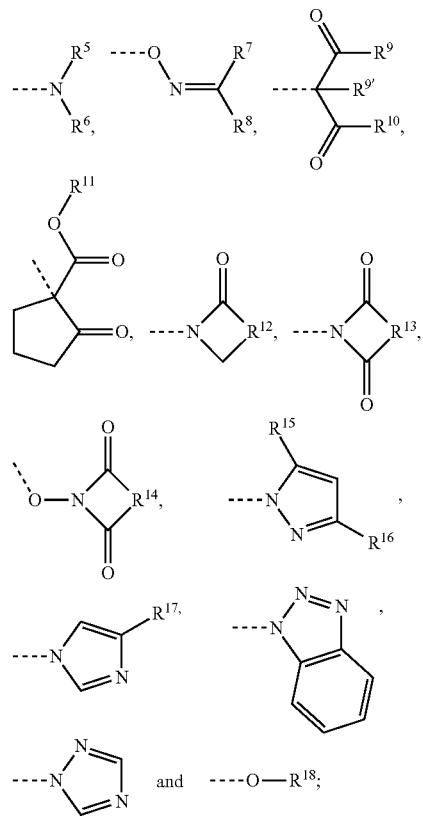

where
in each case $R^5$, $R^6$, $R^7$ and $R^8$, independently of the others, is an alkyl or cycloalkyl or aryl or aralkyl or arylalkyl group, or $R^5$ together with $R^6$, or $R^7$ together with $R^8$, forms a portion of an optionally substituted 4- to 7-membered ring;

in each case $R^9$, $R^{9'}$, and $R^{10}$, independently of the others, is an alkyl or aralkyl or aryl or arylalkyl group, or is an alkyloxy or aryloxy or aralkyloxy group;

$R^{11}$ is an alkyl group, in each case $R^{12}$, $R^{13}$, and $R^{14}$, independently of the others, is an alkylene group having from 2 to 5 carbon atoms and, optionally, having double bonds or substitution, or is a phenylene group, or is a hydrogenated phenylene group;

in each case $R^{15}$, $R^{16}$, and $R^{17}$, independently of the others, is H, or is an alkyl group, or is an aryl group or an aralkyl group; and $R^{18}$ is an aralkyl group or is a mono- or polynuclear substituted or unsubstituted aromatic group which, optionally, has aromatic hydroxy groups; or is a moiety of the formula (V')

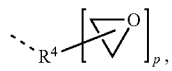

(V')

where $R^4$, independently of the others, is a moiety of an aliphatic, cycloaliphatic, aromatic, or araliphatic epoxide containing a primary or secondary hydroxy group, after the removal of the hydroxide and epoxide groups, and p is a value of 1, 2, or 3.

The broken lines in the formulae in this document in each case represent the bond between the respective substituent and the associated molecular moiety.

The end-capped polyurethane prepolymer of the formula (I) therefore has at least one group of the formula

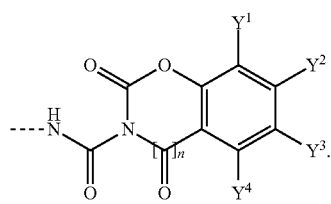

Formula (I) is therefore an umbrella formula for the two formulae (Ia) and (Ib).

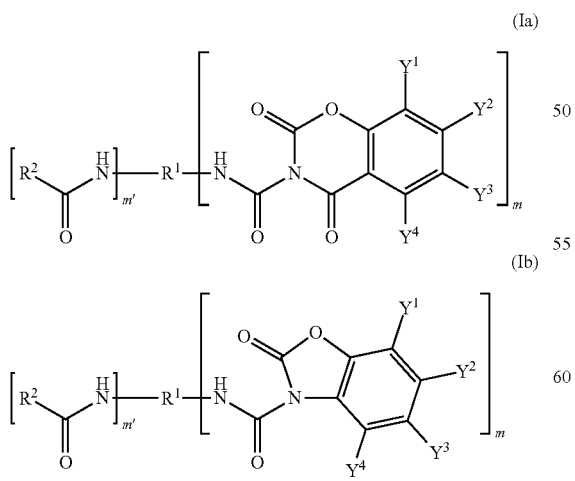

(Ia)

(Ib)

If $Y^1$, $Y^2$, $Y^3$, and/or $Y^4$ is an alkyl group, this is in particular a linear or branched $C_1$-$C_{20}$-alkyl group.

If $Y^1$, $Y^2$, $Y^3$, and/or $Y^4$ is an alkoxy group, this is in particular a linear or branched $C_1$-$C_{20}$-alkoxy group. It is preferable that, among the substituents $Y^1$, $Y^2$, $Y^3$, and $Y^4$, at least two substituents are H. It is particularly preferable that $Y^1$=$Y^2$=$Y^3$=$Y^4$=H.

If $R^5$, $R^6$, $R^7$, $R^8$, $R^9$, $R^{9'}$, $R^{10}$, $R^{11}$, $R^{15}$, $R^{16}$, or $R^{17}$ is an alkyl group, this is in particular a linear or branched $C_1$-$C_{20}$-alkyl group.

If $R^5$, $R^6$, $R^7$, $R^8$, $R^9$, $R^{9'}$, $R^{10}$, $R^{15}$, $R^{16}$, $R^{17}$, or $R^{18}$ is an aralkyl group, this group is in particular an aromatic group bonded by way of methylene, in particular a benzyl group.

If $R^5$, $R^6$, $R^7$, $R^8$, $R^9$, $R^{9'}$, or $R^{10}$ is an alkylaryl group, this is in particular a $C_1$-$C_{20}$-alkyl group bonded by way of phenylene, examples being tolyl or xylyl.

The moieties $R^2$ are preferably the substituents of the formulae

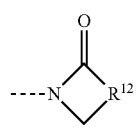

and —O—$R^{18}$. Preferred substituent of the formula

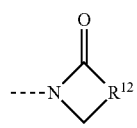

is ε-caprolactam after removal of the NH proton.

Particularly preferred moieties $R^2$ are firstly moieties selected from the group consisting of

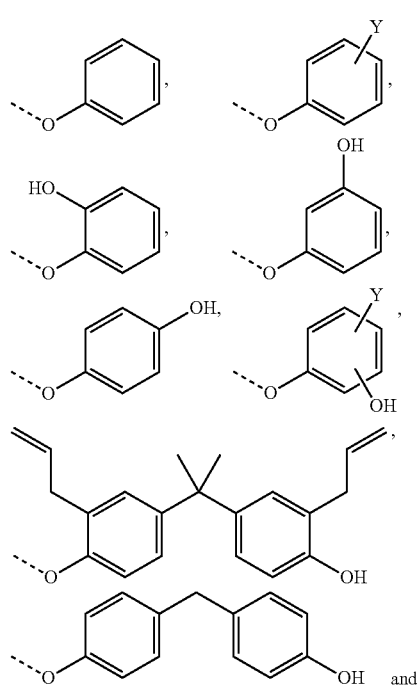

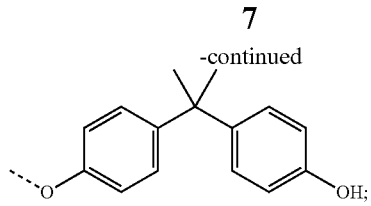

where the moiety Y is a saturated or olefinically unsaturated hydrocarbon moiety having from 1 to 20 carbon atoms, in particular having from 1 to 15 carbon atoms. Moieties preferred as Y are in particular allyl, methyl, nonyl, dodecyl, or an unsaturated C15-alkyl moiety having from 1 to 3 double bonds.

Particularly preferred moieties $R^2$ are secondly moieties of the formula (V")

Preference is given here in particular to a trivalent moiety of the formula

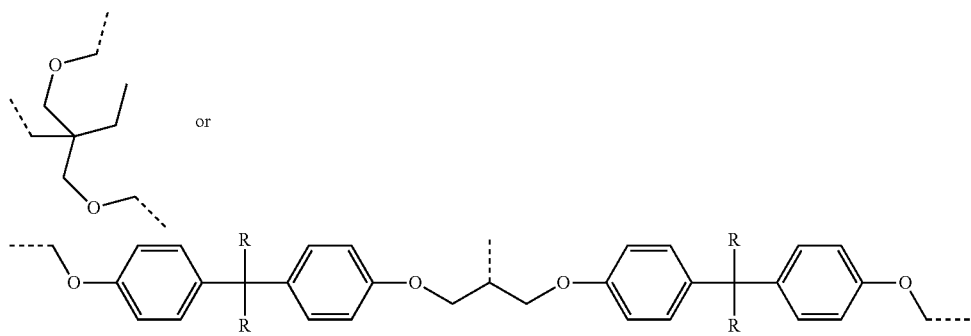

as moiety $R^4$, where R is methyl or H.

Particular moieties that may be considered as $R^2$ are firstly phenols or bisphenols after removal of a hydroxy group. Preferred examples that may be mentioned of these phenols and bisphenols are phenol, cresol, resorcinol, catechol, cardanol, (3-pentadecenylphenol (from cashew nut shell oil)), nonylphenol, bisphenol A, bisphenol F and 2,2'-diallyl-bisphenol A.

m' is particularly preferably 0, i.e. the end-capped polyurethane prepolymer of the formula (I) preferably has no substituents $R^2$. In one particularly preferred embodiment, the end-capped polyurethane prepolymer of the formula (I) has the formula (I').

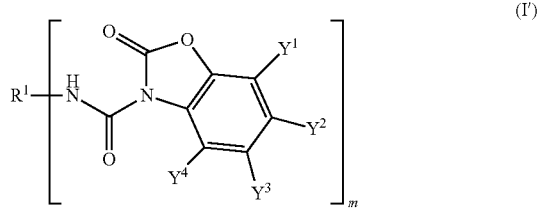

The end-capped polyurethane prepolymer of the formula (I) is produced from the linear or branched polyurethane prepolymer PU1 terminated by isocyanate groups, with at least one isocyanate-reactive compound of the formula

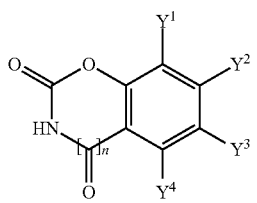

and optionally with one or more isocyanate-reactive compounds $R^2H$.

If a plurality of these isocyanate-reactive compounds are used, the reaction can take place sequentially or with a mixture of said compounds.

The reaction takes place in a manner which uses the one or more isocyanate-reactive compounds stoichiometrically or in a stoichiometric excess, in order to ensure that all of the NCO groups have been reacted.

If $R^2$ has the formula (V"), the corresponding isocyanate-reactive compound is a monohydroxyepoxy compound of the formula (V)

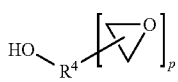

The monohydroxyepoxide compound of the formula (V) has 1, 2, or 3 epoxide groups. The hydroxy group of this monohydroxyepoxide compound (V) can be a primary or secondary hydroxy group.

These monohydroxyepoxide compounds can by way of example be produced via reaction of polyols with epichlorohydrin. As a function of the conduct of the reaction of polyhydric alcohols with epichlorohydrin, the corresponding monohydroxyepoxide compounds are also produced as by-products at various concentrations. These can be isolated via conventional separation operations. However, it is generally possible simply to use the product mixture obtained in the glycidylization reaction of polyols and composed of polyol reacted completely or partially to give the glycidyl ether. Examples of these hydroxylated epoxides are butanediol monoglycidyl ether (present in butanediol diglycidyl ether), hexanediol monoglycidyl ether (present in hexanediol diglycidyl ether), cyclohexanedimethanol glycidyl ether, trimethylolpropane diglycidyl ether (in the form of mixture present in trimethylolpropane triglycidyl ether), glycerol diglycidyl ether (in the form of mixture present in glycerol triglycidyl ether), pentaerythritol triglycidyl ether (in the form of mixture present in pentaerythritol tetraglycidyl ether). It is preferable to use trimethylolpropane diglycidyl ether, a relatively high proportion of which occurs in conventionally produced trimethylolpropane triglycidyl ether.

However, it is also possible to use other similar hydroxylated epoxides, in particular glycidol, 3-glycidyloxybenzyl alcohol, or hydroxymethylcyclohexene oxide. Preference is further given to the β-hydroxy ether of the formula (IX), which is present to an extent of about 15% in commercially available liquid epoxy resins produced from bisphenol A (R=CH₃) and epichlorohydrin, and also the corresponding β-hydroxy ethers of the formula (IX) which are formed during the reaction of bisphenol F (R=H) or of the mixture of bisphenol A and bisphenol F with epichlorohydrin.

cially available products, such as methylenediphenyl diisocyanate (MDI), hexamethylene diisocyanate (HDI), toluene diisocyanate (TDI), tolidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, naphthalene 1,5-diisocyanate (NDI), dicyclohexylmethyl diisocyanate (H₁₂MDI), p-phenylene diisocyanate (PPDI), m-tetramethylxylylene diisocyanate (TMXDI), etc., and also their dimers. Preference is given to HDI, IPDI, MDI or TDI.

Suitable triisocyanates are trimers or biurets of aliphatic, cycloaliphatic, aromatic, or araliphatic diisocyanates, in particular the isocyanurates and biurets of the diisocyanates described in the previous paragraph.

It is, of course, also possible to use suitable mixtures of di- or triisocyanates.

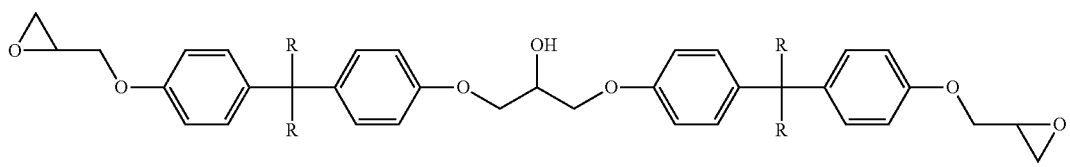

(IX)

Preference is also further given to distillation residues produced during the production of high-purity, distilled liquid epoxy resins. These distillation residues have from one to three times higher concentration of hydroxylated epoxides when compared with commercially available undistilled liquid epoxy resins. It is also possible below to use a very wide variety of epoxides having a β-hydroxy ether group, produced via the reaction of (poly)epoxides with a substoichiometric amount of monofunctional nucleophiles, such as carboxylic acids, phenols, thiols, or secondary amines.

The free primary or secondary OH-functionality of the monohydroxyepoxide compound of the corresponding formula (V) permits efficient reaction with terminal isocyanate groups of prepolymers, without any need here to use disproportionate excesses of the epoxide component.

The end-capped polyurethane prepolymer of the formula (I) advantageously has elastic character and is further advantageously dispersible or soluble in liquid epoxy resins.

The amount of the end-capped polyurethane prepolymer of the formula (I) is advantageously between 1 and 45% by weight, in particular between 3 and 35% by weight, based on the total weight of the heat-curing epoxy resin composition.

The ratio of the number of the epoxide groups of the epoxy resin A to the number of capped isocyanate groups of the end-capped polyurethane prepolymer of the formula (I) is more than 5, in particular from 5 to 100, preferably from 10 to 80. Compositions of this type react primarily by way of hardening by means of the hardener B. The end-capped polyurethane prepolymer of the formula (I) makes only a minor contribution to epoxide curing, and is primarily used as impact modifier in the composition.

The polyurethane prepolymer PU1 on which R¹ is based can be produced from at least one diisocyanate or triisocyanate, or else from a polymer $Q_{PM}$ having terminal amino, thiol, or hydroxy groups, and/or from a polyphenol $Q_{PP}$, optionally being substituted.

In this entire specification, the prefix syllable "poly" in "polyisocyanate", "polyol", "polyphenol", and "polymercaptan" designates molecules which formally contain two or more of the respective functional groups.

Suitable diisocyanates are aliphatic, cycloaliphatic, aromatic, or araliphatic diisocyanates, in particular commer- Particularly suitable polymers $Q_{PM}$ having terminal amino, thiol, or hydroxy groups are polymers $Q_{PM}$ having two or three terminal amino, thiol, or hydroxy groups.

The polymers $Q_{PM}$ advantageously have an equivalent weight of from 300 to 6000, in particular from 600 to 4000, preferably from 700 to 2200, g/equivalent of NCO-reactive groups.

Suitable polymers $Q_{PM}$ are polyols, such as the following commercially available polyols, or any desired mixtures thereof:

polyoxyalkylene polyols, also termed polyether polyols, where these are the polymerization product of ethylene oxide, propylene 1,2-oxide, butylene 1,2- or 2,3-oxide, tetrahydrofuran, or a mixture thereof, optionally polymerized with the aid of a starter molecule having two or three active H atoms, examples being water or compounds having two or three OH groups. The materials used can either be polyoxyalkylene polyols which have a low degree of unsaturation (measured according to ASTM D2849-69 and stated in milliequivalent of unsaturation per gram of polyol (meq/g)), produced by way of example with the aid of what are known as double metal cyanide complex catalysts (abbreviated to DMC catalysts), or else polyoxyalkylene polyols having a higher degree of unsaturation, produced by way of example with the aid of anionic catalysts, such as NaOH, KOH, or alkali metal alcoholates. Particularly suitable materials are polyoxypropylenediols and -triols having a degree of unsaturation below 0.02 meq/g and having a molecular weight in the range from 1000 to 30000 daltons, polyoxybutylenediols and -triols, polyoxypropylenediols and -triols having a molecular weight of from 400 to 8000 daltons, and also the materials termed "EO-end-capped" (ethylene-oxide-endcapped) polyoxypropylenediols or -triols. The latter are specific polyoxypropylene polyoxyethylene polyols obtained by, for example, using ethylene oxide to alkoxylate pure polyoxypropylene polyols after conclusion of the polypropoxylation reaction, so that the products have primary hydroxy groups;

hydroxy-terminated polybutadiene polyols, such as those produced via polymerization of 1,3-butadiene and allyl alcohol or via oxidation of polybutadiene, and also their hydrogenation products;

styrene-acrylonitrile-grafted polyether polyols, such as those supplied as Lupranol® by Elastogran;

polyhydroxy-terminated acrylonitrile/butadiene copolymers such as those obtainable from carboxy-terminated acrylonitrile/butadiene copolymers (available commercially as Hycar® CTBN from Nanoresins AG, Germany) and from epoxides or amino alcohols;

polyester polyols produced by way of example from di- to trihydric alcohols, such as 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane, or a mixture of the abovementioned alcohols, using organic dicarboxylic acids or their anhydrides or esters, examples being succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or a mixture of the above-mentioned acids, and also polyester polyols derived from lactones, such as ε-caprolactone;

polycarbonate polyols, such as those obtainable via reaction, for example, of the abovementioned alcohols—used in the structure of the polyester polyols—with dialkyl carbonates, with diaryl carbonates, or with phosgene.

The polymers $Q_{PM}$ are advantageously at least dihydric polyols having OH-equivalent weights of from 300 to 6000 g/OH-equivalent, in particular from 600 to 4000 g/OH-equivalent, preferably from 700 to 2200 g/OH-equivalent. Further advantageous polyols are those selected from the group consisting of polyethylene glycols, polypropylene glycols, polyethylene glycolpolypropylene glycol block copolymers, polybutylene glycols, hydroxy-terminated polybutadienes, hydroxy-terminated butadiene/acrylonitrile copolymers, hydroxy-terminated synthetic rubbers, their hydrogenation products, and mixtures of the abovementioned polyols.

Other polymers $Q_{PM}$ that can also be used are at least difunctional amino-terminated polyethylene ethers, polypropylene ethers, such as those marketed as Jeffamine® by Huntsman, polybutylene ethers, polybutadienes, butadiene/acrylonitrile copolymers such as those marketed as Hycar® ATBN by Nanoresins AG, Germany, and also other amino-terminated synthetic rubbers or mixtures of the components mentioned.

For certain applications, particularly suitable polymers $Q_{PM}$ are hydroxylated polybutadienes or polyisoprenes, or their partially or completely hydrogenated reaction products.

It is moreover possible that the polymers $Q_{PM}$ can also have been chain-extended, in the manner known to the person skilled in the art, via the reaction of polyamines, polyols, and polyisocyanates, in particular of diamines, diols, and diisocyanates.

Taking the example of a diisocyanate and a diol, the product is, as shown below, as a function of the selected stoichiometry, a species of the formula (VI) or (VII)

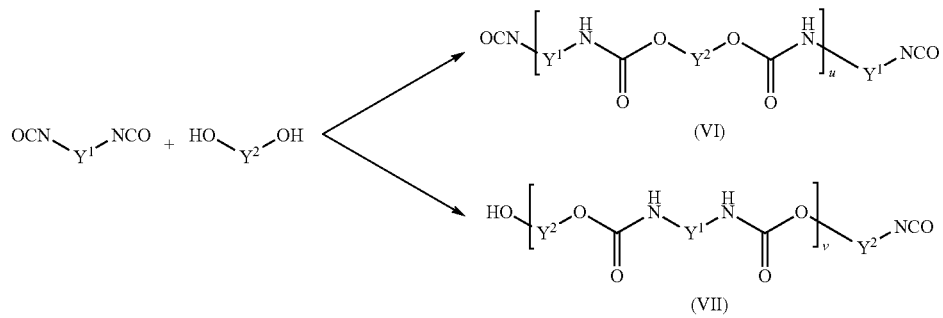

The moieties $Y^1$ and $Y^2$ are a divalent organic moiety, and the indices u and v vary from 1 to, typically, 5 as a function of the stoichiometric ratio.

These species of the formula (VI) or (VII) can then in turn be further reacted. By way of example, a chain-extended polyurethane prepolymer PU1 of the following formula can be formed from the species of the formula (VI) and from a diol using a divalent organic moiety $Y^3$:

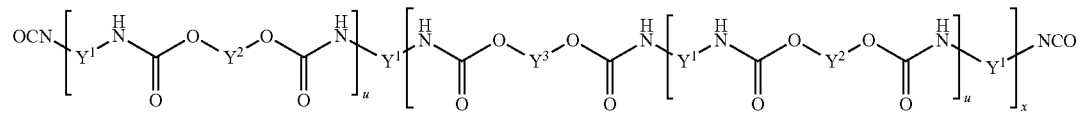

A chain-extended polyurethane prepolymer PU1 of the following formula can be formed from the species of the formula (VII) and from a diisocyanate using a divalent organic moiety $Y^4$:

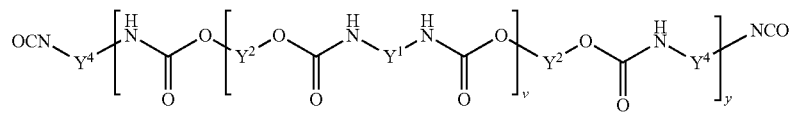

The indices x and y vary from 1 to, typically, 5 as a function of the stoichiometric ratio, and in particular are 1 or 2.

The species of the formula (VI) can moreover also be reacted with the species of the formula (VII), thus producing a chain-extended polyurethane prepolymer PU1 having NCO groups.

For the chain extension reaction, particular preference is given to diols and/or diamines and diisocyanates. The person skilled in the art is, of course, aware that it is also possible to use higher-functionality polyols, such as trimethylolpropane or pentaerythritol, or higher-functionality polyisocyanates, such as isocyanurates of diisocyanates, for the chain extension reaction.

In the case of the polyurethane prepolymers PU1 generally, and in the case of the chain-extended polyurethane prepolymers specifically, it is advantageous to ensure that the prepolymers do not have excessive viscosities, particularly if higher-functionality compounds are used for the chain extension reaction, because this can create difficulties in their reaction to give the polymers of the formula (I), or in the application of the composition.

Preferred polymers $Q_{PM}$ are polyols having molecular weights of from 600 to 6000 daltons, selected from the group consisting of polyethylene glycols, polypropylene glycols, polyethylene glycol-polypropylene glycol block polymers, polybutylene glycols, hydroxy-terminated polybutadienes, hydroxy-terminated butadiene-acrylonitrile copolymers, and also their mixtures.

Particularly preferred polymers $Q_{PM}$ are α,ω-dihydroxypolyalkylene glycols having $C_2$-$C_6$-alkylene groups or having mixed $C_2$-$C_6$-alkylene groups, and having termination by amino, thiol, or, preferably, hydroxy groups. Particular preference is given to polypropylene glycols or polybutylene glycols. Particular preference is further given to polyoxybutylenes terminated by hydroxy groups.

Bis-, tris-, and tetraphenols are particularly suitable as polyphenol $Q_{PP}$. This not only means unsubstituted phenols but also, optionally, means substituted phenols. The nature of the substitution can be very varied. This in particular means substitution directly on the aromatic ring bonded to the phenolic OH group. Phenols here are moreover not only mononuclear aromatics but are also polynuclear or condensed aromatics or heteroaromatics, which have the phenolic OH group directly on the aromatic or heteroaromatic system.

The nature and position of this type of substituent is one of the factors influencing the reaction with isocyanates necessary for the formation of the polyurethane prepolymer PU1.

The bis- and trisphenols are particularly suitable. Examples of suitable bisphenols or trisphenols are 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl) sulfone (=bisphenol S), naphthoresorcinol, dihydroxynaphthalene, dihydroxyanthraquinone, dihydroxybiphenyl, 3,3-bis(p-hydroxyphenyl) phthalides, 5,5-bis (4-hydroxyphenyl)hexahydro-4,7-methanoindane, phenolphthaleine, fluorescein, 4,4'-[bis(hydroxyphenyl)-1,3-phenylenebis(1-methylethylidene)] (=bisphenol M), 4,4'-[bis (hydroxyphenyl)-1,4-phenylenebis(1-methylethylidene)] (=bisphenol P), 2,2'-diallylbisphenol A, diphenols and dicresols produced via reaction of phenols or of cresols with diisopropylidenebenzene, phloroglucinol, gallic esters, phenol novolac, cresol novolac having OH-functionality of from 2.0 to 3.5, and also all of the isomers of the abovementioned compounds.

Preferred diphenols and dicresols produced via reaction of phenols or cresols with diisopropylidenebenzene have the type of chemical structural formula shown accordingly below for cresol as example:

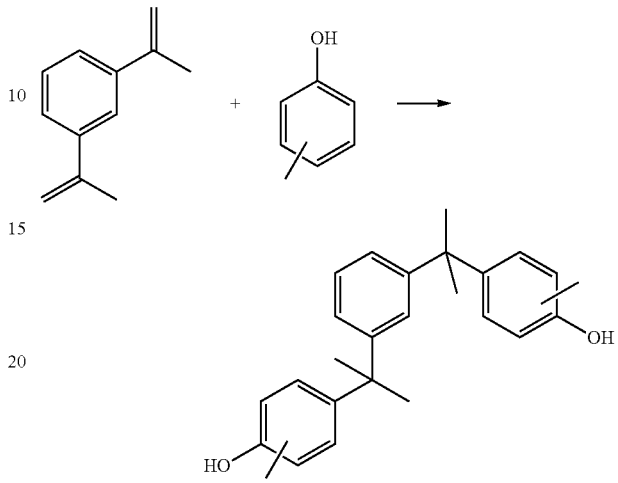

Particular preference is given to low-volatility bisphenols. Most preference is given to bisphenol M, bisphenol S, and 2,2'-diallylbisphenol A.

The $Q_{PP}$ preferably has 2 or 3 phenolic groups.

In one first embodiment, the polyurethane prepolymer PU1 is produced from at least one diisocyanate or triisocyanate, and also from a polymer $Q_{PM}$ having terminal amino, thiol, or hydroxy groups. The polyurethane prepolymer PU1 is produced in a manner known to the person skilled in the art of polyurethanes, in particular by using the diisocyanate or triisocyanate in a stoichiometric excess, based on the amino, thiol, or hydroxy groups of the polymer $Q_{PM}$.

In a second embodiment, the polyurethane prepolymer PU1 is produced from at least one diisocyanate or triisocyanate and also from a polyphenol $Q_{PP}$, optionally is substituted. The polyurethane prepolymer PU1 is produced in a manner known to the person skilled in the art of polyurethanes, in particular by using the diisocyanate or triisocyanate in a stoichiometric excess, based on the phenolic groups of the polyphenol $Q_{PP}$.

In a third embodiment, the polyurethane prepolymer PU1 is produced from at least one diisocyanate or triisocyanate, and also from a polymer $Q_{PM}$ having terminal amino, thiol, or hydroxy groups, and also from a polyphenol $Q_{PP}$ optionally is substituted. Various possibilities are available for production of the polyurethane prepolymer PU1 from at least one diisocyanate or triisocyanate, and also from a polymer $Q_{PM}$ having terminal amino, thiol, or hydroxy groups, and/or from a polyphenol $Q_{PP}$ which, optionally is substituted.

In a first process, termed "one-pot process", a mixture of at least one polyphenol $Q_{PP}$ and of at least one polymer $Q_{PM}$ is reacted with at least one diisocyanate or triisocyanate, using an excess of isocyanate.

In a second process, termed "2-step process I", at least one polyphenol $Q_{PP}$ is reacted with at least one diisocyanate or triisocyanate, using an excess of isocyanate, and this is followed by reaction with a substoichiometric amount of at least one polymer $Q_{PM}$.

Finally, in the third process, termed "2-step process II", at least one polymer $Q_{PM}$ is reacted with at least one diisocyanate or triisocyanate, using an excess of isocyanate, and this is followed by reaction with a substoichiometric amount of at least one polyphenol $Q_{PP}$.

The three processes lead to isocyanate-terminated polyurethane prepolymers PU1 which can differ in the sequence of their units, even if they have the same constitution. All three processes are suitable, but preference is given to "2-step process II".

If the isocyanate-terminal polyurethane prepolymers PU1 described are composed of difunctional components, it was found that the polymer $Q_{PM}$/polyphenol $Q_{PP}$ equivalent ratio is preferably greater than 1.50 and that the polyisocyanate/(polyphenol $Q_{PP}$+polymer $Q_{PM}$) equivalent ratio is preferably greater than 1.20.

If the average functionality of the components used is greater than 2, the molecular-weight increase that takes place is more rapid than in the purely difunctional case. It is clear to the person skilled in the art that the limits of the possible equivalent ratios are highly dependent on whether either the selected polymer $Q_{PM}$, the polyphenol $Q_{PP}$, or the polyisocyanate, or a plurality of the components mentioned, has/have a functionality >2. Various equivalent ratios can be set; the limits of these are determined via the viscosity of the resultant polymers, and the ratios have to be determined experimentally for each individual case.

The polyurethane prepolymer PU1 preferably has elastic character; its glass transition temperature Tg is below 0° C.

The heat-curing epoxy resin composition can further comprise an agent C having thixotropic effect, based on a urea derivative. The urea derivative is in particular a reaction product of an aromatic monomeric diisocyanate with an aliphatic amine compound. It is also fully possible that a plurality of different monomeric diisocyanates are reacted with one or more aliphatic amine compounds or that a monomeric diisocyanate is reacted with a plurality of aliphatic amine compounds. The reaction product of diphenylmethylene 4,4'-diisocyanate (MDI) with butylamine has proven particularly advantageous.

The urea derivative is preferably present in a carrier material. The carrier material can be a plasticizer, in particular a phthalate or an adipate, preferably a diisodecyl phthalate (DIDP) or dioctyl adipate (DOA). The carrier can also be a nondiffusing carrier. This is preferred in order to minimize migration of non-reacted constituents after hardening. Capped polyurethane prepolymers are preferred nondiffusing carriers.

The production of these preferred urea derivatives and of carrier materials is described in detail in the patent application EP 1 152 019 A1. The carrier material is advantageously a capped polyurethane prepolymer PU2, in particular obtained via reaction of a trifunctional polyether polyol with IPDI, followed by capping of the terminal isocyanate groups using ε-caprolactam.

The total proportion of the agent C having thixotropic effect is advantageously from 0 to 40% by weight, preferably from 5 to 25% by weight, based on the weight of the entire composition. The ratio of the weight of the urea derivative to the weight of any carrier present is preferably from 2/98 to 50/50, in particular from 5/95 to 25/75.

The heat-curing epoxy resin composition preferably further comprises a liquid rubber D, which is preferably a carboxy- or epoxide-terminated polymer.

In one first embodiment, this liquid rubber D is a carboxy- or epoxide-terminated acrylonitrile-butadiene copolymer, or a derivative thereof. Liquid rubbers of this type are commercially available by way of example as Hycar® CTBN and CTBNX and ETBN, from Nanoresins AG, Germany. Particularly suitable derivatives are elastomer-modified prepolymers having epoxide groups, examples being those marketed in the Polydis® product line, preferably in the Polydis® 36. product line, from Struktol® (Schill+Seilacher Group, Germany), or in the Albipox product line (Nanoresins, Germany).

It is naturally clear to the person skilled in the art that it is also possible to use mixtures of liquid rubbers, in particular mixtures of carboxy- or epoxide-terminated acrylonitrile/butadiene copolymers or of derivatives thereof.

In a second embodiment, this liquid rubber D is a liquid polyacrylate rubber which is completely miscible with liquid epoxy resins and which demixes only during the hardening of the epoxy resin matrix, to give microdroplets. Liquid polyacrylate rubbers of this type are obtainable by way of example as 20208-XPA from Rohm and Haas.

In a third embodiment, the liquid rubber D is a liquid rubber of the formula (II).

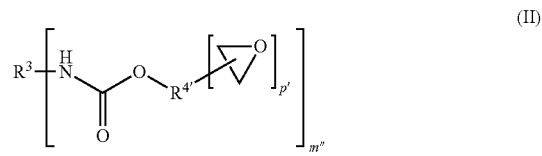

where $R^3$ is a linear or branched polyurethane prepolymer PU1' terminated by m" isocyanate groups, after removal of all of the terminal isocyanate groups, $R^{4'}$ is a moiety of an aliphatic, cycloaliphatic, aromatic, or araliphatic epoxide containing a primary or secondary hydroxy group, after the removal of the hydroxy and epoxide groups, p' is the values 1, 2, or 3, and m" is a value from 2 to 8.

The options and details for the production of the linear or branched polyurethane prepolymer PU1' terminated by isocyanate groups correspond to those described above for the linear or branched polyurethane prepolymer PU1 terminated by isocyanate groups.

The options for $R^{4'}$, p', and m" correspond to those for $R^4$, p and m, as described above for the formula (I) and the formula (V).

In one preferred embodiment, the heat-curing epoxy resin composition comprises at least one epoxide-functional liquid rubber based on an acrylonitrile/butadiene copolymer and comprises at least one epoxide-functional liquid rubber of the formula (II).

The amount used of the liquid rubber D is advantageously from 1 to 45% by weight, in particular from 1 to 25% by weight, based on the weight of the composition.

The heat-curing epoxy resin composition preferably further comprises a solid toughener E. Here and hereinafter, a "toughener" is an additive which is used in an epoxy resin matrix and which, even when the amounts added are small, from 0.1 to 15% by weight, in particular from 0.5 to 8% by weight, brings about a marked increase in toughness, thus permitting absorption of higher flexural, tensile, or impact stresses before the matrix tears or fractures.

In one first embodiment, the solid toughener E is an organic ion-exchanged laminar mineral E1.

The ion-exchanged laminar mineral E1 can be either a cation-exchanged laminar mineral E1c or an anion-exchanged laminar mineral E1a.

The cation-exchanged laminar mineral E1c here is obtained from a laminar mineral E1' in which at least a portion of the cations have been exchanged for organic cations.

Examples of these cation-exchanged laminar minerals E1c are in particular those mentioned in U.S. Pat. No. 5,707,439 or U.S. Pat. No. 6,197,849. Those documents also describe the process for the production of these cation-exchanged laminar minerals E1c. A phyllosilicate is preferred as laminar mineral E1'. The laminar mineral E1' particularly preferably involves a phyllosilicate described in U.S. Pat. No. 6,197,849, column 2, line 38 to column 3, line 5, and particularly involves a bentonite. Laminar minerals E1' such as kaolinite, or a montmorillonite, or a hectorite, or an illite have proven to be particularly suitable.

At least a portion of the cations of the laminar mineral E1' is replaced by organic cations. Examples of cations of this type are n-octylammonium, trimethyldodecylammonium, dimethyldodecylammonium, or bis(hydroxyethyl)octadecylammonium, or similar derivatives of amines which can be obtained from naturally occurring fats and oils; or guanidinium cations, or amidinium cations; or cations of the N-substituted derivatives of pyrrolidine, piperidine, piperazine, morpholine, thiomorpholine; or cations of 1,4-diazabicyclo[2.2.2]octane (DABCO) and 1-azabicyclo[2.2.2]octane; or cations of N-substituted derivatives of pyridine, pyrrole, imidazole, oxazole, pyrimidine, quinoline, isoquinoline, indole, benzimidazole, benzoxazole, thiazole, phenazine and 2,2'-bipyridine. Other suitable cations are cyclic amidinium cations, in particular those disclosed in U.S. Pat. No. 6,197,849 in column 3, line 6 to column 4, line 67. Cyclic ammonium compounds feature increased thermal stability in comparison with linear ammonium compounds, since they cannot undergo thermal Hoffmann degradation.

Preferred cation-exchanged laminar minerals E1c are known to the person skilled in the art by the term organoclay or nanoclay, and are commercially available by way of example within the product groups Tixogel® or Nanofil® (Südchemie), Cloisite® (Southern Clay Products) or Nanomer® (Nanocor Inc.).

The anion-exchanged laminar mineral E1a here is obtained from a laminar mineral E1" in which at least a portion of the anions has been exchanged for organic anions. Examples of this type of anion-exchanged laminar mineral E1a is a hydrotalcite E1" in which at least a portion of the carbonate anions of the intermediate layers has been exchanged for organic anions. A further example is provided by functionalized aluminoxanes, as described by way of example in U.S. Pat. No. 6,322,890.

It is certainly also possible that the composition simultaneously comprises a cation-exchanged laminar mineral E1c and an anion-exchanged laminar mineral E1a.

In a second embodiment, the solid toughener is a block copolymer E2. The block copolymer E2 is obtained from an anionic or controlled free-radical polymerization reaction of methacrylic ester with at least one further monomer having an olefinic double bond. Monomers particularly preferred as those having an olefinic double bond are those in which the double bond has direct conjugation with a heteroatom or with at least one further double bond. Particularly suitable monomers are those selected from the group consisting of styrene, butadiene, acrylonitrile, and vinyl acetate. Preference is given to acrylate-styrene-acrylic acid (ASA) copolymers, obtainable by way of example as GELOY 1020 from GE Plastics.

Particularly preferred block copolymers E2 are block copolymers composed of methyl methacrylate, styrene, and butadiene. Block copolymers of this type are obtainable by way of example in the form of triblock copolymers in the SBM product group from Arkema.

In a third embodiment, the solid toughener E is a core-shell polymer E3. Core-shell polymers are composed of an elastic core polymer and of a rigid shell polymer. Core-shell polymers that are particularly suitable are composed of a core of elastic acrylate polymer or of elastic butadiene polymer, with a surrounding rigid shell of a rigid thermoplastic polymer. This core-shell structure either forms spontaneously via demixing of a block copolymer, or is the inevitable result of using a latex or suspension-polymerization method for the polymerization reaction, with subsequent grafting. Preferred core-shell polymers are those known as MBS polymers, which are available commercially as Clearstrength™ from Atofina, Paraloid™ from Rohm and Haas, or F-351™ from Zeon.

Particular preference is given to core-shell polymer particles present in the form of dried polymer latex. Examples of these are GENIOPERL M23A from Wacker having polysiloxane core and acrylate shell, radiation-crosslinked rubber particles from the NEP line, produced by Eliokem, or Nanoprene from Lanxess, or Paraloid EXL from Rohm and Haas.

Other comparable examples of core-shell polymers are supplied as Albidur™ from Nanoresins AG, Germany.

In a fourth embodiment, the solid toughener E is a solid reaction product E4 of a carboxylated solid nitrile rubber with excess epoxy resin.

Core-shell polymers are preferred as solid toughener E.

The heat-curing epoxy resin composition can in particular comprise an amount of from 0.1 to 15% by weight, preferably from 1 to 8% by weight, based on the weight of the composition, of the solid core-shell polymer E3.

In another preferred embodiment, the composition also comprises at least one filler F. This preferably involves mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminum hydroxide, magnesium oxide, hollow ceramic beads, hollow or solid glass beads, hollow organic beads, or color pigments. Filler F means both the organically coated and the uncoated forms which are commercially available and known to the person skilled in the art.

The total proportion of the entire filler F is advantageously from 3 to 50% by weight, preferably from 5 to 35% by weight, in particular from 5 to 25% by weight, based on the weight of the entire composition.

In another preferred embodiment, the composition comprises a physical or chemical blowing agent, for example one available with trademark Expancel™ from Akzo Nobel or Celogen™ from Chemtura. The proportion of the blowing agent is advantageously from 0.1 to 3% by weight, based on the weight of the composition.

In another preferred embodiment, the composition also comprises at least one reactive diluent G bearing epoxide groups. These reactive diluents G in particular involve:
glycidyl ethers of monohydric saturated or unsaturated, branched or unbranched, cyclic or open-chain $C_4$-$C_{30}$ alcohols, e.g. butanol glycidyl ether, hexanol glycidyl ether, 2-ethylhexanol glycidyl ether, allyl glycidyl ether, tetrahydrofurfuryl glycidyl ether, and furfuryl glycidyl ether, trimethoxysilyl glycidyl ether, etc.,
glycidyl ethers of dihydric saturated or unsaturated, branched or unbranched, cyclic or open-chain $C_2$-$C_{30}$ alcohols, e.g. ethylene glycol glycidyl ether, butanediol glycidyl ether, hexanediol glycidyl ether, octanediol glycidyl ether, cyclohexanedimethanol diglycidyl ether, neopentyl glycol diglycidyl ether, etc.,
glycidyl ethers of tri- or polyhydric, saturated or unsatured, branched or unbranched, cyclic or open-chain alcohols, e.g. epoxidized castor oil, epoxidized trimethylolpropane, epoxidized pentaerythritol, or polyglycidyl ethers of aliphatic polyols, such as sorbitol, glycerol, trimethylolpropane, etc., glycidyl ethers of phenol compounds and of aniline compounds, e.g. phenyl glycidyl ether, cresyl glycidyl ether, p-tert-butylphenyl glycidyl ether, nonylphenol glycidyl ether, 3-n-pentadecenyl glycidyl ether (from cashew nut shell oil), N,N-diglycidylaniline, etc., epoxidized amines, such as N,N-diglycidylcyclohexylamine, etc., epoxidized mono- or dicarboxylic acids, e.g. glycidyl neodecanoate, glycidyl methacrylate, glycidyl benzoate, diglycidyl phthalate, diglycidyl tetrahydrophthalate, diglycidyl hexahydrophthalate, diglycidyl esters of dimeric fatty acids, etc., epoxidized di- or trihydric, low- to high-molecular-weight polyether polyols, e.g. polyethylene glycol diglycidyl ether, polypropylene glycol diglycidyl ether, etc.

Particular preference is given to hexanediol diglycidyl ether, cresyl glycidyl ether, p-tert-butylphenyl glycidyl ether, polypropylene glycol diglycidyl ether, and polyethylene glycol diglycidyl ether.

The total proportion of the reactive diluent G bearing epoxide groups is advantageously from 0.5 to 20% by weight, preferably from 1 to 8% by weight, based on the weight of the entire composition.

The composition can encompass further constituents, in particular catalysts, heat stabilizers and/or light stabilizers, agents with thixotropic effects, plasticizers, solvents, mineral or organic fillers, blowing agents, dyes, and pigments.

It has been found that the heat-curing epoxy resin compositions described are particularly suitable as single-component adhesives. The invention also provides a use of the above-described heat-curing epoxy resin composition as single-component heat-curing adhesive. This type of single-component adhesive has a wide range of possible applications. In particular, it is possible here to realize heat-curing single-component adhesives which feature high impact resistance, not only at relatively high temperatures but also particularly at low temperatures, in particular at from 0° C. to −40° C. Adhesives of this type are needed for the adhesive bonding of heat-resistant materials. Heat-resistant materials are materials which are dimensionally stable at a hardening temperature of from 100 to 220° C., preferably from 120 to 175° C., at least during the hardening time. These materials in particular involve metals and plastics such as ABS, polyamide, polyphenylene ether, composite materials, such as SMC, unsaturated GF-reinforced polyesters, and epoxy composite materials or acrylate composite materials. Preference is given to the application in which at least one material is a metal. A particularly preferred application is the adhesive bonding of identical or different metals, in particular in bodyshell construction in the automobile industry. The preferred metals are particularly steel, in particular electrolytically galvanized or hot-dip galvanized or oiled steel, or Bonazinc-coated steel, and subsequently phosphated steel, and also aluminum, in particular in the variants occurring typically in automobile construction.

An adhesive based on a heat-curing composition of the invention permits achievement of the desired combination of high crash strength together with both high and low usage temperature. In addition to this, the composition has a high level of mechanical properties. In particular, it has been found that glass transition temperatures above 95° C. can be achieved, in particular 100° C. or above, and this is particularly important for applications with high operating temperatures.

A further aspect of the invention therefore provides a process for the adhesive bonding of heat-resistant materials, by bringing said materials into contact with an epoxy resin composition described above, where the process encompasses one or more steps of hardening at a temperature of from 100 to 220° C., preferably from 120 to 175° C. This type of adhesive is in particular first brought into contact at a temperature of from 10° C. to 80° C., in particular from 10° C. to 60° C., with the materials to be adhesive-bonded, and is subsequently hardened at a temperature which is typically from 100 to 220° C., preferably from 120 to 175° C. It is particularly important that the hardening can also actually take place at relatively low temperatures, i.e. at temperatures of from 120 to 160° C. This is particularly advantageous for reasons associated with the technology of energy use and the technology of materials.

This process for the adhesive bonding of heat-resistant materials gives an adhesive-bonded item which represents a further aspect of the present invention. This item is preferably a vehicle or an add-on part of a vehicle.

A composition of the invention can, of course, be used to realize not only heat-curing adhesives but also sealing compositions or coatings. The compositions of the invention are moreover suitable not only for automobile construction but also for other application sectors. Particular mention may be made of related applications in the construction of means of conveyance such as ships, trucks, buses, or rail vehicles, or in the construction of consumer goods, such as washing machines.

The materials adhesive-bonded by means of a composition of the invention are used at temperatures which are typically from 120° C. to −40° C., preferably from 100° C. to −40° C., in particular from 80° C. to −40° C.

It has been found that the end-capped polyurethane prepolymer of the formula (I) can give excellent results when used as impact modifier, i.e. as means for improving impact resistance, in particular in epoxy resins.

It is possible to formulate compositions which typically have fracture energies to ISO 11343 of more than 15.0 J at 23° C. and more than 7.0 J at −30° C. It is sometimes possible to formulate compositions which have fracture energies of more than 17.5 J at 23° C. and of more than 12.0 J at −30° C. Indeed, particularly advantageous compositions have fracture energies of more than 18.0 J at 23° C. and of more than 12.0 J at −30° C.

One particularly preferred application of the heat-curing epoxy resin composition of the invention is the application as heat-curing bodyshell adhesive in vehicle construction.

EXAMPLES

Some examples will be indicated below, providing further illustration of the invention, but not in any way intended to restrict its scope. The raw materials used in the examples are listed in table 1.

TABLE 1

Raw materials used.

| Raw materials used | Supplier |
| --- | --- |
| D.E.R. 330 (bisphenol A diglycidyl ether = "DGEBA") | Dow |
| D.E.R. 671 ("type 1" solid resin) (EP-equivalent weight 475-550 g/eq) | Dow |
| Albipox XP 23/0277 ("Albipox") | Nanoresins |
| Polypox R7 (tert-butylphenyl-glycidyl ether) | UPPC |

TABLE 1-continued

Raw materials used.

| Raw materials used | Supplier |
|---|---|
| Dicyandiamide | Degussa |
| Poly-THF 2000 (difunctional polybutylene glycol) (OH-equivalent weight = about 1000 g/OH-equivalent) | BASF |
| Poly-THF 1800 (difunctional polybutylene glycol) (OH-equivalent weight = about 900 g/OH-equivalent) | BASF |
| Liquiflex H (hydroxy-terminated polybutadiene) (OH-equivalent weight = about 1230 g/OH-equivalent) | Krahn |
| Caradol ED56-10 (difunctional polypropylene glycol) (OH-equivalent weight = about 1000 g/OH-equivalent) | Shell |
| Isophorone diisocyanate (=IPDI) | Degussa-Hüls |
| 2-Benzoxazolinone | Sigma-Aldrich |
| ε-Caprolactam | EMS Chemie |
| Cardolite NC-700 (Cardanol, meta-substituted alkenyl monophenol) | Cardolite |
| 2,2'-Diallylbisphenol A | Sigma-Aldrich |
| F-351 ™ (core-shell polymer) | Zeon |

Example of Production of a Monohydroxylated Epoxide MHE

Trimethylolpropane glycidyl ether was produced by the process in U.S. Pat. No. 5,668,227, example 1, starting from trimethylolpropane and epichlorohydrin, using tetramethylammonium chloride and sodium hydroxide solution. The product is yellowish, with an epoxy number of 7.5 eq/kg and with hydroxy group content of 1.8 eq/kg. The HPLC MS spectrum indicates that it is in essence a mixture of trimethylolpropane diglycidyl ether and trimethylolpropane triglycidyl ether. This product was used as MHE.

Examples of the Production of End-Capped Polyurethane Prepolymers of the Formula (I)

Polyurethane Prepolymer PU1-1

150.00 g of PolyTHF 2000 (OH number: 57 mg/g of KOH) and 150 Liquiflex H(OH number: 46 mg/g KOH) were dried at 105° C. in vacuo for 30 minutes. Once the temperature had been reduced to 90° C., 64.0 g of IPDI and 0.13 g of dibutyltin dilaurate were added. The reaction was conducted in vacuo at 90° C. until NCO content was constant at 3.30%, after 2.5 h (calculated NCO content: 3.38%).

Polyurethane Prepolymer PU1-2

300 g of PolyTHF 2000 (OH number: 57 mg/g of KOH) were dried at 105° C. in vacuo for 30 minutes. Once the temperature had been reduced to 90° C., 70.7 g of IPDI and 0.13 g of dibutyltin dilaurate were added. The reaction was conducted in vacuo at 90° C. until NCO content was constant at 3.50%, after 2.5 h (calculated NCO content: 3.67%).

Polyurethane Prepolymer PU1-3 (Pre-Extended)

22.9 g of 2,2'-diallylbisphenol A were added as pre-extender agent to 370.7 g of the polyurethane prepolymer PU1-2. The mixture was stirred in vacuo at 90° C. for 3 h, until NCO content was constant at 1.70% (calculated NCO content: 1.87%).

BlockPrep-1

46.4 g of 2-benzoxazolinone were added as capping agent to 364.0 g of the polyurethane prepolymer PU1-1. Stirring was continued in vacuo at 105° C. until NCO content had fallen below 0.1%, after 3.5 h.

BlockPrep-2

50.1 g of 2-benzoxazolinone were added as capping agent to 370.7 g of the polyurethane prepolymer PU1-2. Stirring was continued in vacuo at 105° C. until NCO content had fallen below 0.1%, after 3.5 h.

BlockPrep-3

25.8 g of 2-benzoxazolinone were added as capping agent to 393.6 g of the polyurethane prepolymer PU1-3. Stirring was continued in vacuo at 105° C. until NCO content had fallen below 0.1%, after 3.5 h.

BlockPrep-R1

38.8 g of ε-caprolactam were added as capping agent to 364.0 g of the polyurethane prepolymer PU1-1. Stirring was continued in vacuo at 105° C. until NCO content had fallen below 0.1%, after 3.5 h.

BlockPrep-R2

103.0 g of Cardolite NC-700 were added as capping agent to 364.0 g of the polyurethane prepolymer PU1-1. Stirring was continued in vacuo at 105° C. until NCO content had fallen below 0.1%, after 3.5 h.

BlockPrep-R3

114.3 g of 2,2'-diallylbisphenol A were added as capping agent to 370.7 g of the polyurethane prepolymer PU1-2. Stirring was continued in vacuo at 105° C. until NCO content had fallen below 0.1%, after 3.5 h.

BlockPrep-R4

41.9 g of ε-caprolactam were added as capping agent to 370.7 g of the polyurethane prepolymer PU1-2. Stirring was continued in vacuo at 105° C. until NCO content had fallen below 0.1%, after 3.5 h.

BlockPrep-R5

111.2 g of Cardolite NC-700 were added as capping agent to 370.7 g of the polyurethane prepolymer PU1-2. Stirring was continued in vacuo at 105° C. until NCO content had fallen below 0.1%, after 3.5 h.

Example of Production of a Liquid Rubber Based on a Polyurethane Prepolymer of the Formula (II) (EP1) Terminated by Epoxide Groups 160 g of PolyTHF 1800 (OH number: 62.3 mg/g of KOH), 110 g of Liquiflex H(OH number: 46 mg/g of KOH), and 130 g of Caradol ED 56-10 (OH number: 56 mg/g of KOH) were dried at 105° C. in vacuo for 30 minutes. Once the temperature had been reduced to 90° C., 92.5 g of IPDI and 0.08 g of dibutyltin dilaurate were added. The reaction was conducted at 90° C. in vacuo until NCO content was constant at 3.60%, after 2.5 h (calculated NCO content: 3.62%). 257.8 g of the MHE described above were then added to this polyurethane prepolymer, and the reaction was continued in vacuo at 90° C. until there was no residual measurable NCO content.

Production of the Compositions

As shown in table 2, the reference compositions Ref. 1 to Ref. 11 and the compositions 1, 2, 3, 4, 5, 6 and 7 of the invention were produced.

The amount of dicyandiamide was adapted to the epoxy group concentration in each case.

Test Methods:

Tensile Shear Strength (TSS) (DIN EN 1465)

The test specimens were produced from the compositions described, and using electrolytically galvanized DC04 steel (eloZn) with dimensions 100×25×1.5 mm, the adhesive area being 25×10 mm, with layer thickness 0.3 mm. Curing was carried out for 30 min. at 175° C. The tensile testing rate was 10 mm/min.

Tensile Strength (TS) (DIN EN ISO 527)

A specimen of adhesive was pressed to a layer thickness of 2 mm between two Teflon papers. The adhesive was then cured for 30 minutes at 175° C. The Teflon papers were removed, and the test specimens in accordance with the DIN standard were stamped out while hot. The test specimens were stored for 1 day under standard conditions of temperature and humidity and then tested using a tensile testing rate of 2 mm/min.

Tensile strength was determined to DIN EN ISO 527.

Cleavage Under Dynamic Load (ISO 11343)

The test specimens were produced from the compositions described, using electrolytically galvanized DC04 steel (eloZn) with dimensions 90×20×0.8 mm, the adhesive area being 20×30 mm, with a layer thickness of 0.3 mm. They were cured at 175° C. for 30 min. Cleavage under dynamic load was in each case measured at room temperature and at −30° C. The dynamic rate was 2 m/s. The area under the test curve (from 25% to 90%, to ISO 11343) is stated as fracture energy (FE) in joules.

Glass Transition Temperature ($T_g$)

Glass transition temperature was determined by means of DSC. Mettler DSC822$^e$ equipment was used for this. From 20 to 30 mg of adhesive sample were in each case weighed into an aluminum crucible. Once the specimen had been cured at 175° C. for 30 min. in the DSC, it was cooled to −20° C. and then heated up to 150° C. at a heating rate of 20° C./min. Glass transition temperature was determined from the measured DSC curve, with the aid of the DSC software.

Table 2 collates the results of these tests.

TABLE 2

Compositions and results.

| | Ref. 1 | Ref. 2 | 1 | Ref. 3 | Ref. 4 | 2 | Ref. 5 | Ref. 6 | 3 |
|---|---|---|---|---|---|---|---|---|---|
| D.E.R.671 [Pbw[1]] | 7.2 | 7.2 | 7.2 | 7.2 | 7.2 | 7.2 | 7.2 | 7.2 | 7.2 |
| DGEBA [Pbw[1]] | 26.8 | 26.8 | 26.8 | 33.8 | 33.8 | 33.8 | 33.8 | 33.8 | 33.8 |
| Polypox R7 [Pbw[1]] | 5.0 | 5.0 | 5.0 | 5.0 | 5.0 | 5.0 | 5.0 | 5.0 | 5.0 |
| Albipox [Pbw[1]] | 12.0 | 12.0 | 12.0 | | | | 16.0 | 16.0 | 16.0 |
| EP1 [Pbw[1]] | 12.0 | 12.0 | 12.0 | 12.0 | 12.0 | 12.0 | | | |
| BlockPrep-R1 [Pbw[1]] | 12.0 | | | 12.0 | | | 12.0 | | |
| BlockPrep-R2 [Pbw[1]] | | 12.0 | | | 12.0 | | | 12.0 | |
| BlockPrep-1 [Pbw[1]] | | | 12.0 | | | 12.0 | | | 12.0 |
| BlockPrep-R3 [Pbw[1]] | | | | | | | | | |
| BlockPrep-R4 [Pbw[1]] | | | | | | | | | |
| BlockPrep-R5 [Pbw[1]] | | | | | | | | | |
| BlockPrep-2 [Pbw[1]] | | | | | | | | | |
| BlockPrep-3 [Pbw[1]] | | | | | | | | | |
| Dicyandiamide [Pbw[1]] | 3.86 | 3.86 | 3.86 | 3.86 | 3.86 | 3.86 | 4.18 | 4.18 | 4.18 |
| Modified uron hardener [Pbw[1]] | 0.4 | 0.4 | 0.4 | 0.4 | 0.4 | 0.4 | 0.4 | 0.4 | 0.4 |
| Filler mixture [Pbw[1]] | 19.0 | 19.0 | 19.0 | 19.0 | 19.0 | 19.0 | 19.0 | 19.0 | 19.0 |
| F-351 ™ [Pbw[1]] | | | | 5.0 | 5.0 | 5.0 | | | |
| ZF [MPa] | 27.8 | 28.6 | 26.2 | 27.6 | 26.5 | 24.6 | 34.0 | 37.4 | 34.0 |
| ZSF [MPa] | 27.0 | 28.7 | 29.0 | 25.7 | 32.1 | 31.6 | 29.9 | 30.1 | 25.6 |
| [2]FE at 23° C. [J] | 4.8 | 18.1 | 18.7 | 3.3 | 16.0 | 15.0 | 9.7 | 16.2 | 16.7 |
| [2]FE at −30° C. [J] | 2.7 | 11.9 | 12.6 | 1.9 | 10.6 | 11.0 | 3.2 | 2.1 | 7.9 |
| $T_g$ [° C.] | 94 | 88 | 102 | 102 | 93 | 107 | 95 | 99 | 104 |

| | Ref. 7 | Ref. 8 | Ref. 9 | 4 | 5 | Ref. 10 | Ref. 11 | 6 | 7 |
|---|---|---|---|---|---|---|---|---|---|
| D.E.R.671 [Pbw[1]] | 7.2 | 7.2 | 7.2 | 7.2 | 7.2 | 7.2 | 7.2 | 7.2 | 7.2 |
| DGEBA [Pbw[1]] | 26.8 | 26.8 | 26.8 | 33.8 | 33.8 | 33.8 | 33.8 | 33.8 | 33.8 |
| Polypox R7 [Pbw[1]] | 5.0 | 5.0 | 5.0 | 5.0 | 5.0 | 5.0 | 5.0 | 5.0 | 5.0 |
| Albipox [Pbw[1]] | 12.0 | 12.0 | 12.0 | 12.0 | 12.0 | | | | |
| EP1 [Pbw[1]] | 12.0 | 12.0 | 12.0 | 12.0 | 12.0 | 18.0 | 18.0 | 18.0 | 18.0 |
| BlockPrep-R1 [Pbw[1]] | | | | | | | | | |
| BlockPrep-R2 [Pbw[1]] | | | | | | | | | |
| BlockPrep-1 [Pbw[1]] | | | | | | | | | |
| BlockPrep-R3 [Pbw[1]] | 12.0 | | | | | | | | |
| BlockPrep-R4 [Pbw[1]] | | 12.0 | | | | | 12.0 | | |
| BlockPrep-R5 [Pbw[1]] | | | 12.0 | | | | 12.0 | | |
| BlockPrep-2 [Pbw[1]] | | | | 12.0 | | | | 12.0 | |
| BlockPrep-3 [Pbw[1]] | | | | | 12.0 | | | | 12.0 |
| Dicyandiamide [Pbw[1]] | 3.86 | 3.86 | 3.86 | 3.86 | 3.86 | 3.92 | 3.92 | 3.92 | 3.92 |
| Modified uron hardener [Pbw[1]] | 0.4 | 0.4 | 0.4 | 0.4 | 0.4 | 0.4 | 0.4 | 0.4 | 0.4 |
| Filler mixture [Pbw[1]] | 19.0 | 19.0 | 19.0 | 19.0 | 19.0 | 19.0 | 19.0 | 19.0 | 19.0 |
| F-351 ™ [Pbw[1]] | | | | | | | | | |
| ZF [MPa] | 32.6 | 23.6 | 27.9 | 27.1 | 26.6 | 21.8 | 29.7 | 24.9 | 24.9 |
| ZSF [MPa] | 31.1 | 25.9 | 29.0 | 29.2 | 29.8 | 22.5 | 29.7 | 29.9 | 29.8 |
| [2]FE at 23° C. [J] | 18.7 | 4.6 | 18.0 | 17.7 | 18.5 | 4.0 | 16.4 | 16.7 | 16.8 |
| [2]FE at −30° C. [J] | 7.6 | 2.1 | 10.2 | 14.3 | 14.3 | 2.5 | 11.9 | 12.7 | 13.1 |
| $T_g$ [° C.] | 100 | 97 | 90 | 101 | 99 | 96 | 90 | 104 | 103 |

[1]Pbw = parts by weight
[2]FE = fracture energy

What is claimed is:

1. A heat-curing epoxy resin composition comprising:
at least one epoxy resin A having an average of more than one epoxide group per molecule;
at least one hardener B for epoxy resins, where the at least one hardener is activated via an elevated temperature;
at least one end-capped polyurethane prepolymer of the formula (I)

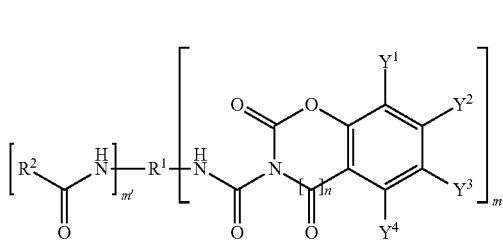

(I)

wherein:
R$^1$ is a linear or branched polyurethane prepolymer PU1 terminated by m+m' isocyanate groups, after removal of all of the terminal isocyanate groups;
n is 0 or 1,
m is a value from 1 to 8 and m' is a value from 0 to 7, wherein m+m' is a value from 2 to 8;
Y$^1$, Y$^2$, Y$^3$ and Y$^4$, independently of the others, are H, halogen, NO$_2$, alkyl, or alkoxy;
and R$^2$, independently of the others, is a substituent selected from the group consisting of:

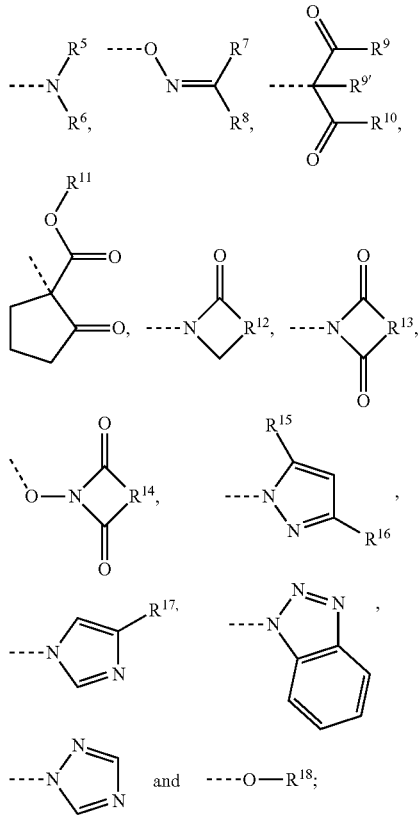

where R$^5$, R$^6$, R$^7$ and R$^8$, independently of the others, is an alkyl or cycloalkyl or aryl or aralkyl or arylalkyl group, or R$^5$ together with R$^6$, or R$^7$ together with R$^8$, forms a portion of 4- to 7-membered ring which is optionally substituted;
where R$^9$, R$^{9'}$, and R$^{10}$, independently of the others, is an alkyl or aralkyl or aryl or arylalkyl group, or is an alkyloxy or aryloxy or aralkyloxy group;
where R$^{11}$ is an alkyl group,
where R$^{12}$, R$^{13}$, and R$^{14}$, independently of the others, is an alkylene group having from 2 to 5 carbon atoms and, optionally, having double bonds or substitution, or is a phenylene group, or is a hydrogenated phenylene group;
where R$^{15}$, R$^{16}$, and R$^{17}$, independently of the others, is H, or is an alkyl group, or is an aryl group or an aralkyl group; and
where R$^{18}$ is an aralkyl group or is a mono- or polynuclear substituted or unsubstituted aromatic group which, optionally, has aromatic hydroxy groups; or is a moiety of the formula

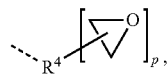

where R$^4$, independently of the others, is a moiety of an aliphatic, cycloaliphatic, aromatic, or araliphatic epoxide containing a primary or secondary hydroxy group, after the removal of the hydroxide and epoxy groups, and p is a value of 1, 2, or 3, and
wherein the polyurethane prepolymer PU1 is produced from:
at least one diisocyanate or triisocyanate,
a polymer Q$_{PM}$ having terminal amino, thiol, or hydroxy groups, and
a polyphenol Q$_{PP}$ which optionally is substituted.

2. The heat-curing epoxy resin composition as claimed in claim 1, wherein Y$^1$=Y$^2$=Y$^3$=Y$^4$=H.

3. The heat-curing epoxy resin composition as claimed in claim 1, wherein n=0.

4. The heat-curing epoxy resin composition of claim 1, wherein R$^2$ is a substituent of the formula

—O—R$^{18}$.

5. The heat-curing epoxy resin composition as claimed in claim 4, wherein R$^2$ is selected from the group consisting of

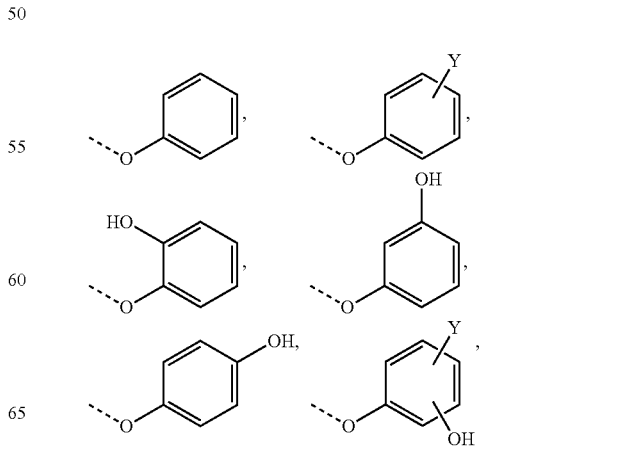

-continued

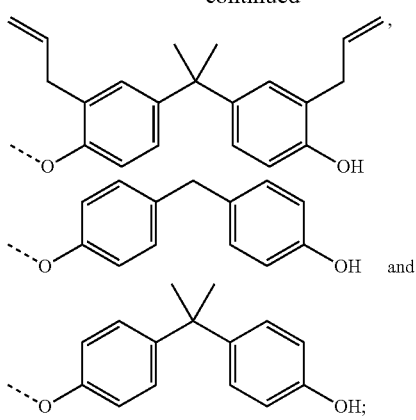

where Y is a saturated or olefinically unsaturated hydrocarbon moiety having from 1 to 20 carbon atoms.

6. The heat-curing epoxy resin composition as claimed in claim 4, wherein $R^2$ is a substituent of the formula

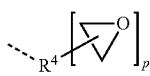

where $R^4$ is a trivalent moiety of the formula

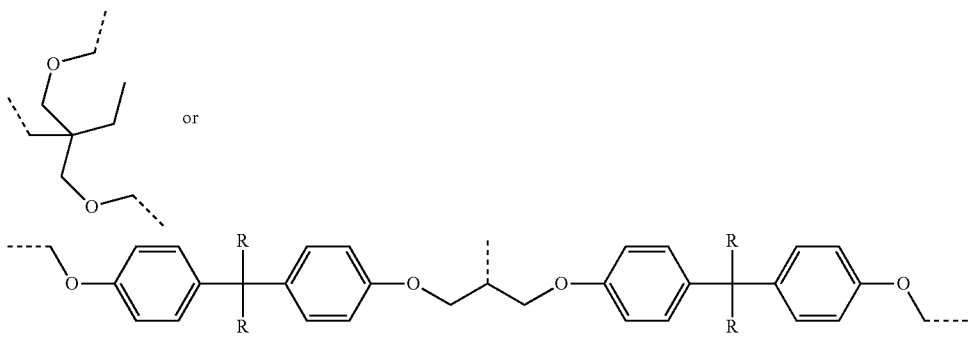

where R is methyl or H.

7. The heat-curing epoxy resin composition as claimed in claim 1, wherein the polymer $Q_{PM}$ has 2 or 3 terminal amino, thiol, or hydroxy groups.

8. The heat-curing epoxy resin composition as claimed in claim 1, wherein the polymer $Q_{PM}$ is an α,ω-dihydroxypolyalkylene glycol having $C_2$-$C_6$-alkylene groups, having $C_2$-$C_6$-alkylene groups having more than one type of $C_2$-$C_6$-alkylene group, and having termination by amino, thiol, or hydroxy groups.

9. The heat-curing epoxy resin composition as claimed in claim 1, wherein the polymer $Q_{PM}$ is a hydroxylated polybutadiene or polyisoprene, or a partially or completely hydrogenated reaction product thereof.

10. The heat-curing epoxy resin composition of claim 1, wherein the polymer $Q_{PM}$ has an OH-equivalent weight of from 300 to 6000 g/OH-equivalent.

11. The heat-curing epoxy resin composition of claim 1, wherein the polyphenol $Q_{PP}$ has 2 or 3 phenolic groups.

12. The heat-curing epoxy resin composition of claim 1, wherein the diisocyanate or triisocyanate used for the production of the polyurethane prepolymer PU1 is a diisocyanate.

13. The heat-curing epoxy resin composition of claim 1, wherein the hardener B is a hardener selected from the group consisting of dicyandiamide, guanamines, guanidines, aminoguanidines, and their derivatives; substituted ureas and anime complexes.

14. The heat-curing epoxy resin composition of claim 1, the composition further comprising at least one agent C with thixotropic effect, based on urea derivative in a carrier material, in an amount of from 0 to 40% by weight, based on a total weight of the composition.

15. The heat-curing epoxy resin composition of claim 1, the composition further comprising at least one liquid rubber D, which is a carboxy- or epoxide-terminated polymer, in an amount of from 1 to 45% by weight, based on a total weight of the composition.

16. The heat-curing epoxy resin composition as claimed in claim 15, wherein the liquid rubber D has the formula (II)

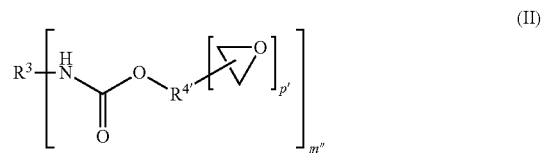

where $R^3$ is a linear or branched polyurethane prepolymer PU1' terminated by m" isocyanate groups, after removal of all of the terminal isocyanate groups, $R^{4'}$ is a moiety of an aliphatic, cycloaliphatic, aromatic, or araliphatic epoxide containing a primary or secondary hydroxy group, after the removal of the hydroxide and epoxide groups, p' is the values 1, 2, or 3, and m" is a value from 2 to 8.

17. The heat-curing epoxy resin composition as claimed in claim 16, the composition further comprising at least one epoxide-functional liquid rubber based on an acrylonitrile/butadiene copolymer, and at least one epoxide-functional liquid rubber of the formula (II) for the liquid rubber D.

18. The heat-curing epoxy resin composition of claim 1, the composition further comprising a solid toughener E in an amount of from 0.1 to 15% by weight, based on a total weight of the composition.

19. The heat-curing epoxy resin composition as claimed in claim 18, wherein the solid toughener E is a core-shell polymer.

20. The heat-curing epoxy resin composition of claim 1, the composition further comprising at least one filler F in an amount of from 3 to 50% by weight, based on a total weight of the composition.

21. The heat-curing epoxy resin composition of claim 1, the composition further comprising at least one blowing agent in an amount of from 0.1 to 3% by weight, based on a total weight of the composition.

22. The heat-curing epoxy resin composition of claim 1, further comprising a reactive diluent G bearing epoxide groups, where the amount of this diluent is from 0.5 to 20% by weight, based on a total weight of the composition.

23. The heat-curing epoxy resin composition of claim 1, wherein the proportion of the epoxy resin A is from 10 to 85% by weight, based on a total weight of the composition.

24. The heat-curing epoxy resin composition of claim 1, wherein the proportion of the end-capped polyurethane prepolymer of the formula (I) is from 1 to 45% by weight, based on a total weight of the composition.

25. A method of adhesive bonding, the method comprising:
providing a heat-curing epoxy resin composition as claimed in claim 1.

26. A process for the adhesive bonding of heat-resistant materials, the method comprising:
bringing the heat-resistant materials into contact with the heat-curing epoxy resin composition of claim 1, and
hardening the heat-curing epoxy resin composition at a temperature of from 100 to 220° C.

27. The process for adhesive bonding as claimed in claim 26, wherein the bringing forms adhesive bonded materials, and, the adhesive-bonded materials are subjected to temperatures of from 120° C. to −40° C.

28. An adhesive-bonded item obtained from the process recited in claim 26.

29. The adhesive-bonded item as claimed in claim 28, wherein the item is a vehicle or an add-on part of a vehicle.

30. A heat-curing epoxy resin composition comprising:
at least one epoxy resin A having an average of more than one epoxide group per molecule;
at least one hardener B for epoxy resins, where the at least one hardener is activated via an elevated temperature;
at least one end-capped polyurethane prepolymer of the formula (I)

$$[R^2\underset{O}{\underset{\|}{C}}\underset{H}{\overset{H}{N}}]_{m'}R^1\underset{O}{\underset{\|}{C}}\underset{H}{\overset{H}{N}}[N\underset{O}{\underset{\|}{C}}O\begin{matrix}Y^1\\Y^2\\Y^3\\Y^4\end{matrix}]_m \quad (I)$$

wherein:
R¹ is a linear or branched polyurethane prepolymer PU1 terminated by m+m' isocyanate groups, after removal of all of the terminal isocyanate groups;
n is 0 or 1;
m is a value from 1 to 8 and m' is a value from 1 to 7, wherein m+m' is a value from 2 to 8;
Y¹, Y², Y³ and Y⁴, independently of the others, are H, halogen, NO₂, alkyl, or alkoxy;
and R², independently of the others, is a substituent selected from the group consisting of:

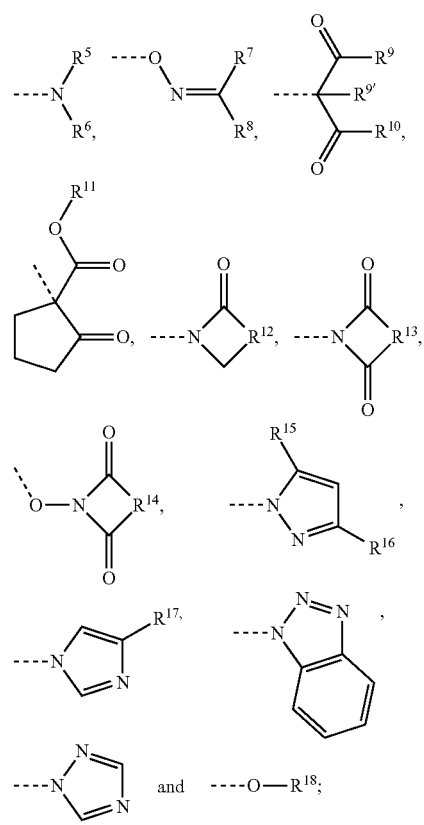

where R⁵, R⁶, R⁷ and R⁸, independently of the others, is an alkyl or cycloalkyl or aryl or aralkyl or arylalkyl group, or R⁵ together with R⁶, or R⁷ together with R⁸, forms a portion of 4- to 7-membered ring which is optionally substituted;
where R⁹, R⁹', and R¹⁰, independently of the others, is an alkyl or aralkyl or aryl or arylalkyl group, or is an alkyloxy or aryloxy or aralkyloxy group;
where R¹¹ is an alkyl group,
where R¹², R¹³, and R¹⁴, independently of the others, is an alkylene group having from 2 to 5 carbon atoms and, optionally, having double bonds or substitution, or is a phenylene group, or is a hydrogenated phenylene group;
where R¹⁵, R¹⁶, and R¹⁷, independently of the others, is H, or is an alkyl group, or is an aryl group or an aralkyl group; and
where R¹⁸ is an aralkyl group or is a mono- or polynuclear substituted or unsubstituted aromatic group which, optionally, has aromatic hydroxy groups; or is a moiety of the formula

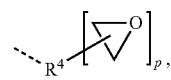

where R⁴, independently of the others, is a moiety of an aliphatic, cycloaliphatic, aromatic, or araliphatic epoxide containing a primary or secondary hydroxy group, after the removal of the hydroxide and epoxide groups, and p is a value of 1, 2, or 3.

* * * * *